US008146069B2

(12) United States Patent
Shamilian et al.

(10) Patent No.: US 8,146,069 B2
(45) Date of Patent: Mar. 27, 2012

(54) METHOD AND APPARATUS FOR PERFORMING NON SERVICE AFFECTING SOFTWARE UPGRADES IN PLACE

(75) Inventors: John H. Shamilian, Tinton Falls, NJ (US); Thomas L. Wood, Colts Neck, NJ (US)

(73) Assignee: Alcatel Lucent, Paris (FR)

( * ) Notice: Subject to any disclaimer, the term of this patent is extended or adjusted under 35 U.S.C. 154(b) by 1216 days.

(21) Appl. No.: 11/862,657

(22) Filed: Sep. 27, 2007

(65) Prior Publication Data

US 2009/0085916 A1 Apr. 2, 2009

(51) Int. Cl.
*G06F 9/44* (2006.01)
*G06F 9/45* (2006.01)
*G06F 9/445* (2006.01)
*G01R 31/08* (2006.01)

(52) U.S. Cl. ........ 717/157; 717/113; 717/168; 717/174; 370/230; 370/235

(58) Field of Classification Search .................. None
See application file for complete search history.

(56) References Cited

U.S. PATENT DOCUMENTS

| 7,376,945 | B1 * | 5/2008 | Kakumani et al. | 717/171 |
|---|---|---|---|---|
| 7,461,374 | B1 * | 12/2008 | Balint et al. | 717/174 |
| 7,536,676 | B2 * | 5/2009 | Baker et al. | 717/113 |
| 7,869,363 | B2 * | 1/2011 | Shamilian et al. | 370/235 |
| 2002/0083314 | A1 * | 6/2002 | Uyttendaele et al. | 713/1 |
| 2005/0102615 | A1 * | 5/2005 | Roman et al. | 715/513 |
| 2005/0132350 | A1 * | 6/2005 | Markley et al. | 717/168 |
| 2008/0288931 | A1 * | 11/2008 | Kohli | 717/157 |
| 2009/0089770 | A1 | 4/2009 | Shamilian et al. | |
| 2009/0219814 | A1 * | 9/2009 | Shamilian et al. | 370/235 |
| 2009/0296573 | A1 * | 12/2009 | Shamilian et al. | 370/230 |

OTHER PUBLICATIONS

"Non-Service Affecting Software Upgrades for Multi-Service Routers", Antti Kankkunen, 2005 IEEE, pp. 295-300; <http://ieeexplore.ieee.org/search/searchresult.jsp?newsearch=true&queryText=non-service+affecting+software+upgrades>.*
"Implementing On-line Software Upgrades in Java", Martha Gebremichael, May 2003, University of Maryland, College Park, pp. 1-21; <http://www.google.com/#q=runtime+software+upgrading>.*
"Practical Dynamic Software Updating for C", Michael Hicks, 2006 ACM, pp. 72-83 <http://dl.acm.org/results.cfm?h=1&cfid=68073395&cftoken=48520821>.*

* cited by examiner

*Primary Examiner* — Thuy Dao
*Assistant Examiner* — Ben Wang
(74) *Attorney, Agent, or Firm* — Wall & Tong, LLP (57) ABSTRACT

The invention includes a method and apparatus for upgrading software represented as a graph, where the graph has a plurality of states and a plurality of state transitions and tokens traverse the graph executing functions. A method includes identifying a target region of the graph, obtaining a new region for the graph, determining a correspondence between states of the target region of the graph and states of the new region for the graph, and replacing the target region of the graph with the new region for the graph using the correspondence between states of the target region of the graph and states of the new region for the graph. The target region of the graph may be replaced by suspending the operation of the target region of the graph, or while the target region of the graph continues running.

18 Claims, 9 Drawing Sheets

METHOD AND APPARATUS FOR PERFORMING NON SERVICE AFFECTING SOFTWARE UPGRADES IN PLACE

FIELD OF THE INVENTION

The invention relates to the field of software applications and, more specifically, to performing upgrades of software applications.

BACKGROUND OF THE INVENTION

Software applications, such as Voice-Over-IP (VoIP) call control as performed by a VoIP Media Gateway Controller (MGC), have been realized using an approach in which a high-level language is used to describe the data processing and message exchange behavior of the VoIP MGC. In a VoIP MGC, an execution engine accepts a high-level graph language file that is used by the execution engine to create internal data structures which realize the behaviors described in the input language file. The combination of the execution engine and the high-level graph language file (which describes the VoIP MGC behavior) results in a system that exhibits the desired VoIP MGC processing characteristics.

In such software applications, as well as other software applications, performing software upgrades typically requires that the system be brought down while the upgrade is performed, or, more commonly, requires redundant hardware to which system functions may be switched while the upgrade is performed. For example, where a system is implemented using redundant hardware, a secondary hardware element may protect a primary hardware element, both during failure conditions, as well as during software upgrades. Disadvantageously, implementation of systems using redundant hardware is expensive and, further, still requires a full switchover of system functionality during software upgrades.

SUMMARY OF THE INVENTION

Various deficiencies in the prior art are addressed through the invention of a method and apparatus for upgrading software represented as a graph, where the graph has a plurality of states and a plurality of state transitions and tokens traverse the graph executing functions. A method includes identifying a target region of the graph, obtaining a new region for the graph, determining a correspondence between states of the target region of the graph and states of the new region for the graph, and replacing the target region of the graph with the new region for the graph using correspondence between states of the target region of the graph and states of the new region for the graph. The target region of the graph may be replaced by suspending the operation of the target region of the graph, or while the target region of the graph continues running.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables software to be updated, in place, without requiring the software to be stopped and restarted, thereby enabling portions of software that are not being updated and, optionally even portions of the software that are being updated, to continue to function while portions of software are being updated. The present invention enables explicit control over a graph such that a target region of a graph may be isolated from the remaining regions of the graph and the target region of the graph may be replaced with a new region intended for the graph. Although primarily depicted and described herein within the context of updating a VoIP call control element software application, the present invention is applicable to any software constructed using a graph language.

Figure 1:
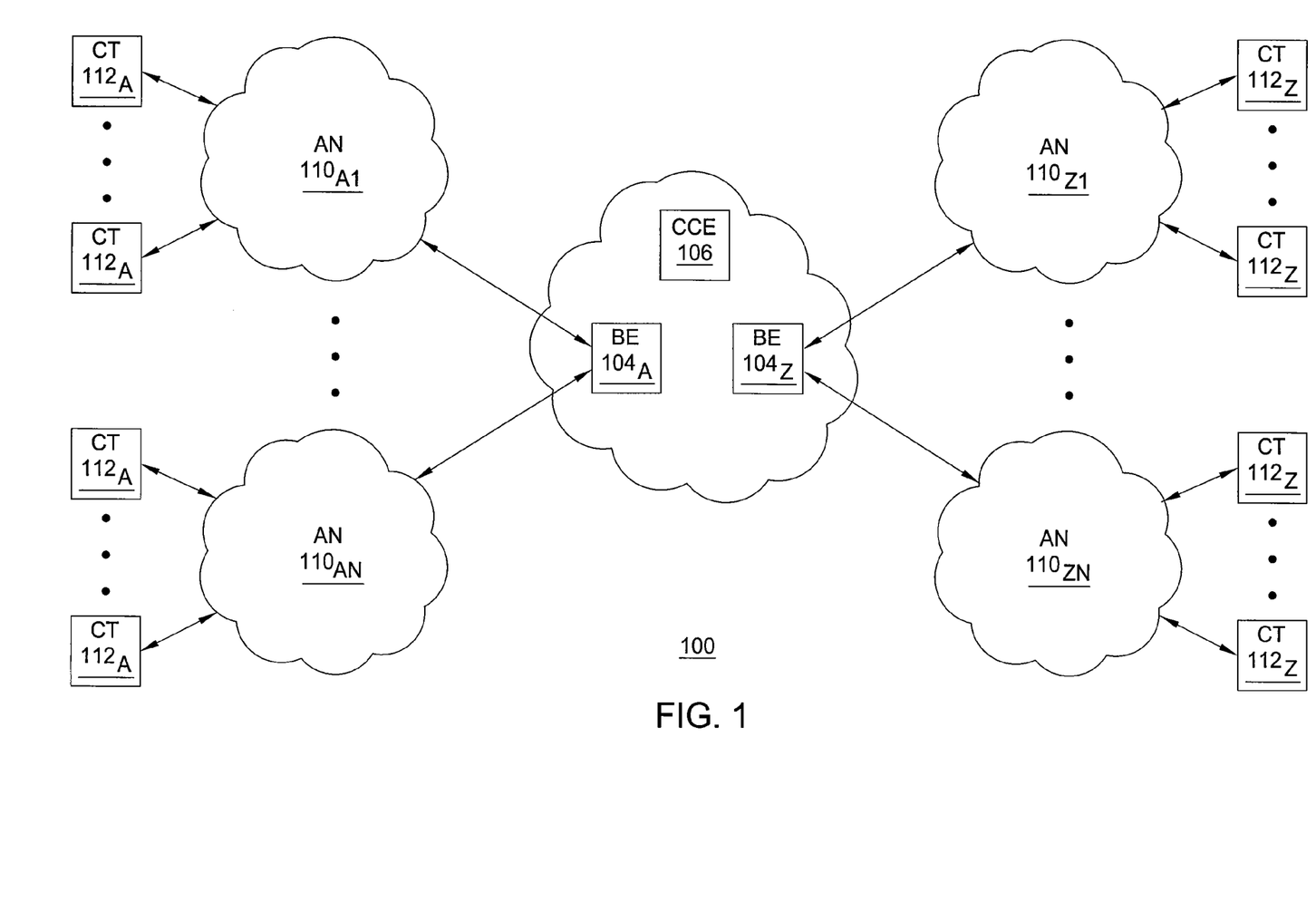
FIG. 1 depicts a high-level block diagram of a communication network.

FIG. 1 depicts a high-level block diagram of a communication network. Specifically, communication network 100 of FIG. 1 includes a core VoIP network 102, a plurality of access networks (ANs) $110_{A1}$-$110_{AN}$ and $110_{Z1}$-$110_{ZN}$ (collectively, ANs 110), and a plurality of customer terminals (CTs) $112_A$ and $112_Z$ (collectively, CTs 112). The core VoIP network 102 includes a plurality of border elements (BEs) $104_A$ and $104_Z$ (collectively, BEs 104) and a call control element (CCE) 106. The core VoIP network 102 (including BEs 104 and CCE 106) and ANs 110 cooperate to provide end-to-end VoIP services to CTs 112. The core IP network 102 communicates with ANs 110 (via BEs 104) using various communication paths. The ANs 110 communicate with CTs 112 using various communication paths.

The core VoIP network 102 supports VoIP services. The BEs 104, which reside at the edge of core VoIP network 102, interface with CTs 112 over ANs 110. The BEs 104 perform signaling, call admission control, media control, security, and like functions, as well as various combinations thereof. For example, BEs 104 may be Media Gateways, VoIP Gateways, and the like, as well as various combinations thereof. The CCE 106 resides within core VoIP network 102. The CCE 106 interacts with BEs 104, as well as other components of core IP network 102, to provide VoIP-related functions and services, e.g., performing network wide call-control related functions as well as interacting with VoIP service related servers (e.g., media servers, application servers, and the like) as necessary. For example, CCE 106 may be a Media Gateway Controller (MGC), a softswitch, and the like (and may also be referred to as a call agent). The CCE 106 and BEs 104 may communicate using various protocols, such as Media Gateway Control Protocol (MGCP), Simple Gateway Control Protocol (SGCP), Megago (i.e., H.248), Session Initiation Protocol (SIP), H.323, and the like. Although primarily depicted and described herein with respect to a specific core network, the present invention is independent of the type of core network.

The ANs 110 may be packet-based ANs, (Time Division Multiplexing) TDM-based ANs, and the like, as well as various combinations thereof. A TDM-based access network may be used to support TDM-based customer terminals, such as customer endpoint devices connected via traditional telephone lines. For example, a TDM-based access network may be the Public Switched Telephone Network (PSTN). A packet-based access network may be used to support IP-based customer endpoint devices and/or TDM-based customer endpoint devices. For example, a packet-based access network may be based on one or more of IP, Ethernet, Frame Relay (FR), Asynchronous Transfer Mode (ATM), and the like, as well as various combinations thereof A packet-based access network (e.g., such as a cable network, Digital Subscriber Line (DSL) network, and the like) may include a terminal adapter (TA) such that the packet-based access network can support TDM-based customer endpoint devices. Although primarily depicted and described herein with respect to specific types of access networks, the present invention is independent of the type of access network.

The CTs 112 may be packet-based CTs, TDM-based CTs, and the like, as well as various combinations thereof. The CTs 112 may be customer network elements and/or customer endpoint devices. With respect to packet-based CTs, for example, CTs 112 may include customer network elements, such as VoIP gateways, VoIP routers, IP-PBXs (Internet Protocol-Private Branch Exchange), and like customer network elements supporting IP-based customer endpoint devices such as computers, IP phones, and the like, as well as various combinations thereof. With respect to TDM-based CTs, for example, CTs 112 may include TDM-PBXs (Time Division Multiplexing-Private Branch Exchange), TAs (which provide interworking functions between TDM-based customer endpoint devices and the core IP network), and like customer network elements supporting TDM-based customer endpoint devices such as analog phones. Although primarily depicted and described herein with respect to specific types of customer terminals, the present invention is independent of the type of customer terminals supported.

Although omitted for purposes of clarity, core VoIP network 102 may include various other VoIP components, such as core elements (CEs), Media Servers (MSs), VoIP-related Application Servers (ASs), and the like, as well as various combinations thereof. Although omitted for purposes of clarity, each of the ANs 110 may include various components depending on the type of access network and the type of customer terminals being supported (e.g., such as IP-PBXs, TAs, TDM-PBXs, routers, and the like, as well as various combinations thereof). In other words, communication network 100 is merely provided for purposes of describing the present invention within the context of one of many possible applications of the present invention. The present invention may be used to provide software upgrades in place for any software capable of being controlled in accordance with the present invention.

As described herein, communication network 100 enables VoIP calls to be established between CTs 112. A call scenario is now described In order to illustrate the operation of communication network 100 in completing a VoIP call between CTs (e.g., one of the CTs $112_A$ and one of the CTs $112_Z$). A customer using CT $112_A$ (calling party) initiates a call to a customer using CT $112_Z$ (called party). A call setup signaling message is sent from CT $112_A$ to BE $104_A$, which sends a call setup signaling message to CCE 106. The CCE 106 examines the called party information and queries one or more VoIP service ASs to obtain information necessary to complete the call. Upon determining that BE $104_Z$ must be involved in completing the call, CCE 106 sends another call setup signaling message to BE $104_Z$, which forwards the call signaling setup message to CT $112_Z$. If the call is accepted by the called party, a call acknowledgement signaling message is sent from CT $112_Z$ to CCE 106 via BE $104_Z$. Upon receiving the call acknowledgement message, CE 106 sends a call acknowledgement signaling message toward the calling party and, further, provides information associated with the call to BEs $104_A$ and $104_Z$ (so that the call data exchange proceeds directly between BEs $104_A$ and $104_Z$).

As such, CCE 106 supports call flows adapted to handle signaling required to complete calls between CTs 112. The call flows supported by CCE 106 are provided using call flow software implemented on CCE 106. As networks and services evolve, the set of call flows that must be supported by CCE 106 changes, requiring updates to various portions of the software implemented on CCE 106. Disadvantageously, in existing networks, updates to portions of the software implemented on CCE 106 require all software implemented on CCE 106 to be stopped and restarted, thus requiring the network operator to either (1) accept network downtime during the software upgrade or (2) switch service from CCE 106 to a redundant CCE (omitted for purposes of clarity) in order to continue to provide call control functions during the software upgrade. The present invention advantageously enables portions of the software implemented on CCE 106 to be upgraded in place, thereby enabling unaffected portions of the software to continue to run on CCE 106 during the software upgrade. The operation of the present invention in performing software upgrades in place may be better understood with respect to FIGS. 2-8.

Figure 2:
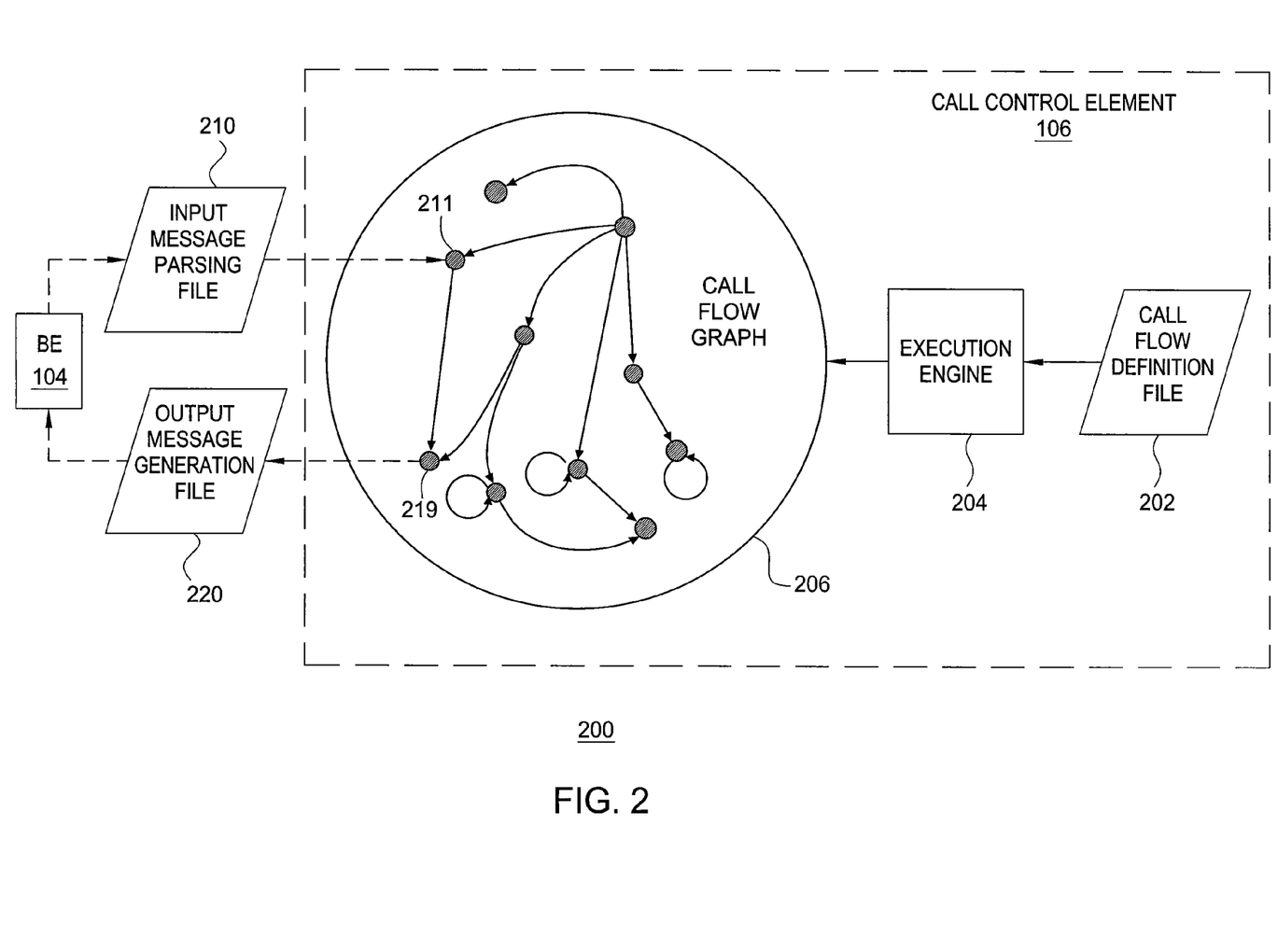
FIG. 2 depicts a high-level block diagram of interaction between the call control element and border element of the communication network of FIG. 1.

FIG. 2 depicts a high-level block diagram of interaction between the call control element and border element of the communication network of FIG. 1. As depicted in FIG. 2, a call flow definition file 202 is read into an execution engine 204 producing a call flow graph 206 (which may be more generally referred to herein as a call flow). The call flow definition file 202 explicitly defines the call flow in terms of states, state transitions, message translations, and the like. The execution engine 204 reads in the call flow definition file 202, processing the call flow definition file to produce call flow graph 206. The call flow graph 206 is software, including internal data structures, that runs on CCE 106 to realize the behaviors (e.g., functions and services), as described in call flow definition file 202, that need to be supported by CCE 106. The execution engine 204 is adapted to perform various functions of the present invention in order to perform software upgrades in place. Specifically, execution engine 204 is adapted to isolate a target region and replace the target region of the graph with a new region for the graph while at least the remainder of the graph (and, in some embodiments, the entire graph) continues running.

As depicted in FIG. 2, which depicts an example of a function that may be provided by CCE 106 using call flow 206, CCE 106 receives an input message parsing file 210 from BE 104 (e.g., as part of a VoIP control message). The CCE 106 processes the input message parsing file 210 using call flow graph 206. Specifically, input message parsing file 210 initializes a portion of the call flow graph 206 to an entry state (illustratively, state 211), from which call flow graph 206 transitions to an exit state (illustratively, state 219), thereby causing CCE 106 to generate an output message generation file 220 in response to the input message parsing file 210. The CCE 106 transmits the output message generation file 220 to BE 104 (e.g., as part of a VoIP control message). Thus, call flow graph 206 instantiated by CCE 106 using call flow definition file 202 enables CCE 106 to provide various functions and services. The operation of call flow graph 206 may be better understood with respect to FIG. 3. The operation of execution engine 204 in modifying a target region of a graph may be better understood with respect to FIG. 4-FIG. 8.

Figure 3:
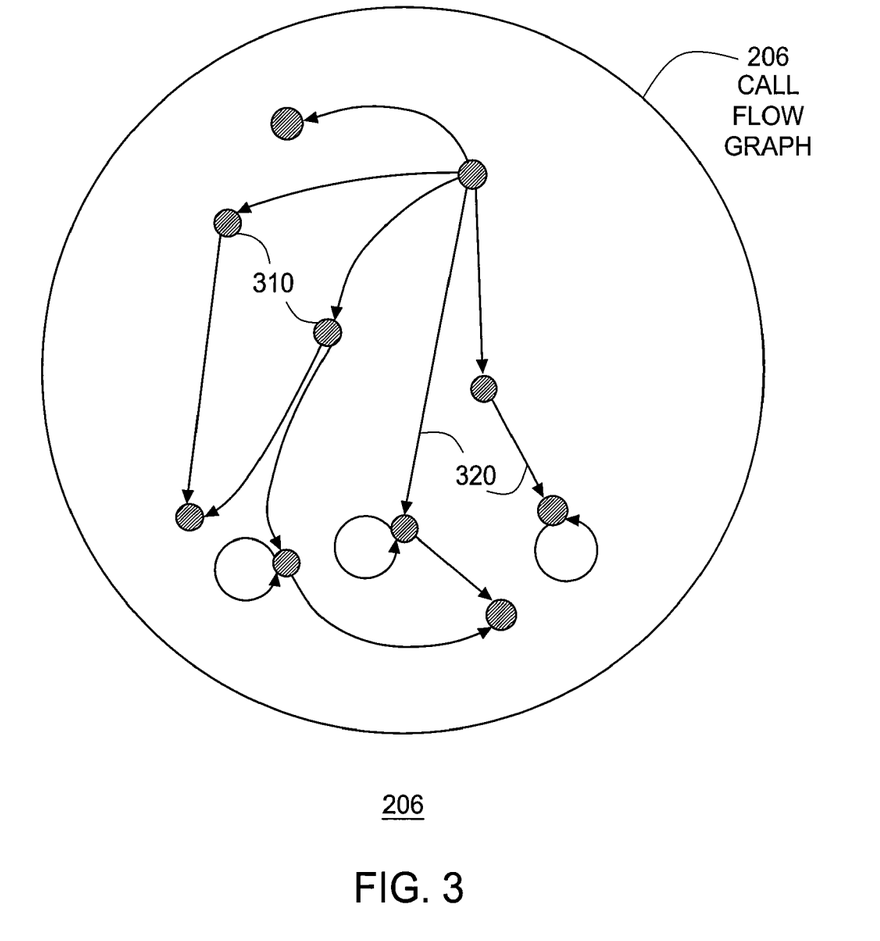
FIG. 3 depicts the call flow graph depicted and described with respect to FIG. 2.

FIG. 3 depicts the call flow graph depicted and described with respect to FIG. 2. Specifically, call flow graph 206 is a graphical representation of call flow software. The call flow graph 206 includes a plurality of states 310 (collectively, states 310) and a plurality of state transitions 320 (collectively, state transitions 320). A multiplicity of tokens circulates within call flow graph 206, executing one or more functions during each of the state transitions 320 between states 310. For example, transition functions may include functions such as parsing incoming messages (e.g., from external devices, from other tokens, and the like), sending outgoing messages (e.g., to external devices, to other tokens, and the like), and the like, as well as various combinations thereof.

A graph may include one or more graph regions. A graph region is a set of one or more graph functions. A graph function is a function invoked at an entry state (e.g., using a "graph call" function), in which control is passed back to the entry state, rather than to an arbitrary next state, such that there is a set of states that are partitionable from other graph functions of the graph (i.e., partitionable starting with the entry state and including all states up to and including the state that uses a "graph return" to send control back to the entry state). For purposes of clarity, the state transitions from return states to entry states (i.e., graph returns) are omitted from FIG. 3.

As such, a graph function includes an entry state and a returning state (which, for some functions, may be the same state as the entry state), and, optionally, one or more intermediate states. In other words, a graph function includes one or more states (i.e., a graph function may, in some instances, consist of a single state). The operation of a graph function may be better understood with respect to FIG. 4, which depicts an exemplary graph function which may be representative of any graph function of the call flow graph of FIG. 3 or any other graph composed of graph functions.

Figure 4:
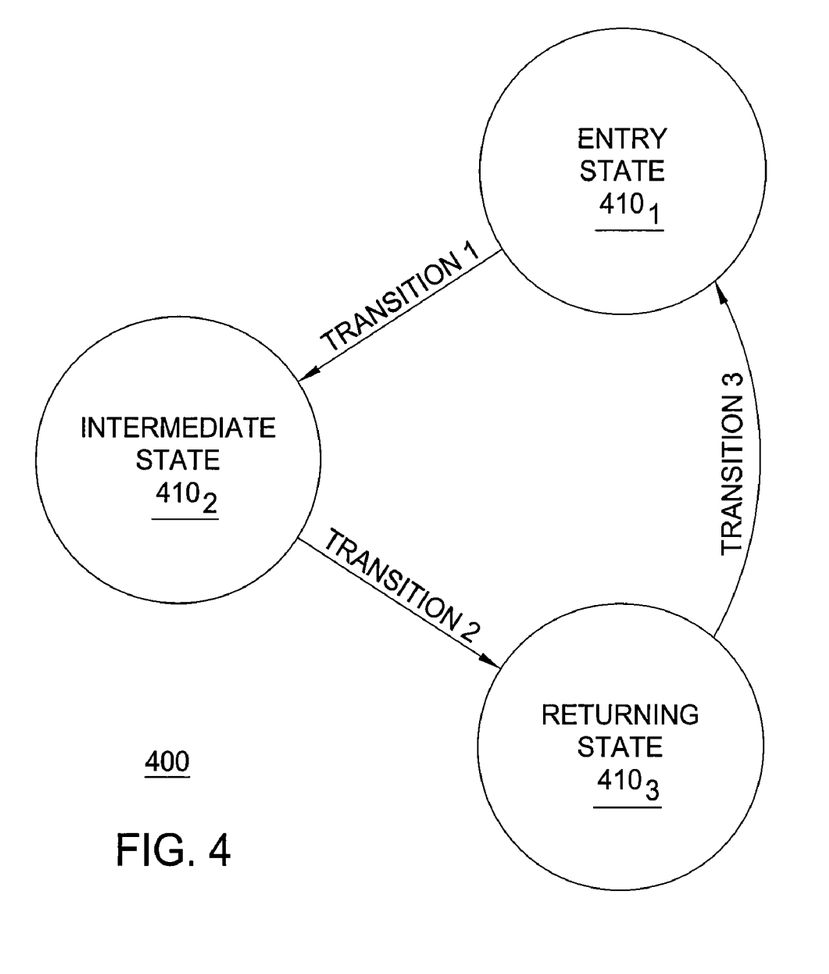
FIG. 4 depicts an exemplary graph function.

FIG. 4 depicts an exemplary graph function. As depicted in FIG. 4, graph function 400 of FIG. 4 includes an entry state $410_1$, an intermediate state $410_2$, and a returning state $410_3$. The graph function 400 is entered at entry state $410_1$. The "graph call" method invoked at entry state $410_1$ pushes its own state number onto the graph stack (for use later by the "graph return" method invoked by the returning state $410_3$). As graph function 400 executes, graph function 400 transitions from entry state $410_1$ to intermediate state $410_2$ (denoted as transition 1), transitions from intermediate state $410_2$ to returning state $410_3$ (denoted as transition 2), and transitions from returning state $410_3$ to entry state $410_1$ (denoted as transition 3). The "graph return" method invoked at returning state $410_3$ pulls the next state from the graph stack.

As described herein, a graph region may include one or more graph functions, and each graph function is a set of states and associated state transitions that are partitionable from other graph functions of the graph. Thus, a graph region may be partitioned from other graph regions, thereby resulting in a target graph region which may be updated in place while one or more other graph regions (i.e., at least the remaining, non-partitioned portions of the graph and, optionally, also the partitioned portion of the graph that is being updated) continue running. A target graph region targeted for (and partitioned for) an associated software upgrade is depicted and described herein with respect to FIG. 5.

Figure 5:
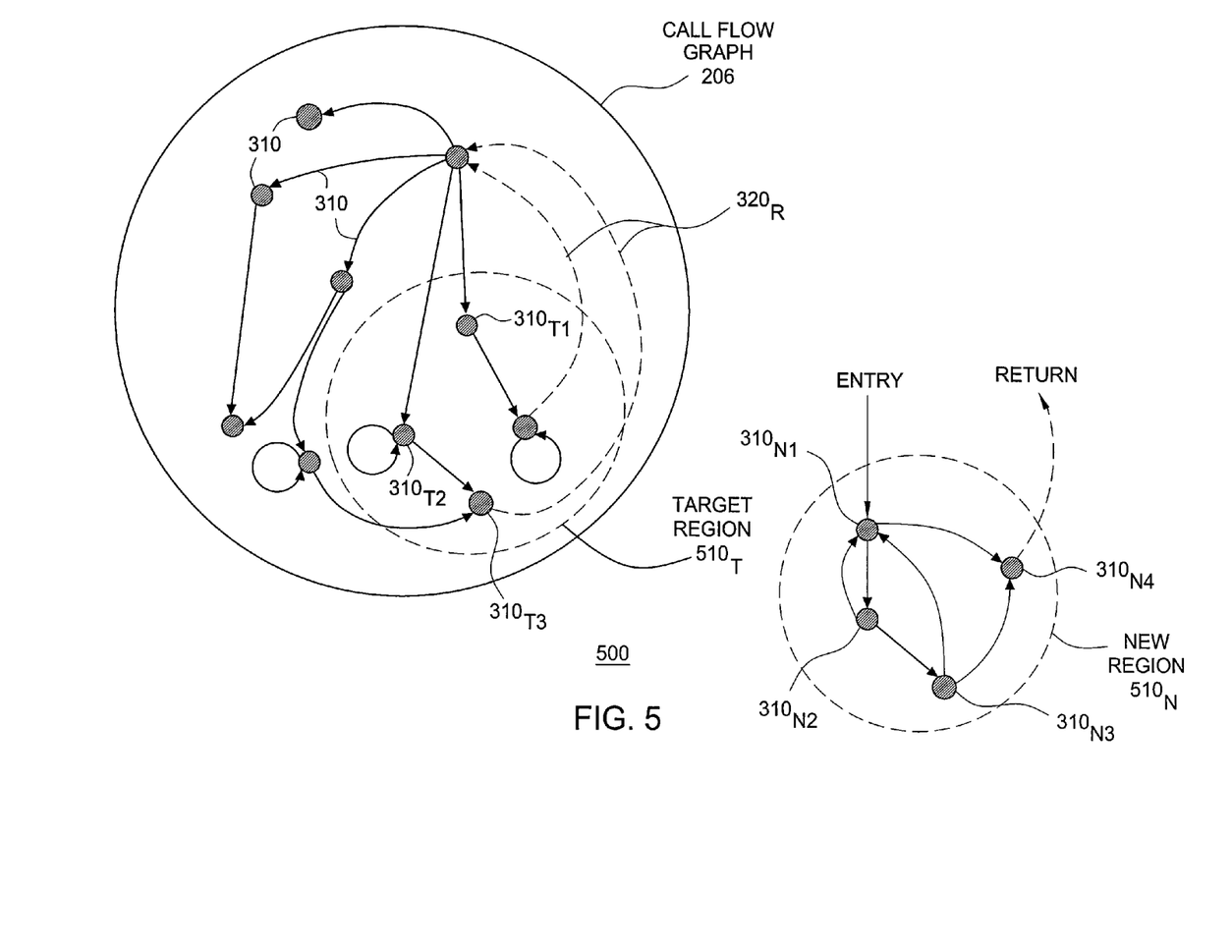
FIG. 5 depicts a partitioned graph in which a target region of a graph is partitioned for an associated software upgrade using a new region intended for the graph.

FIG. 5 depicts a partitioned graph in which a target region of a graph is partitioned for an associated software upgrade using a new region intended for the graph. As depicted in FIG. 5, a portion of call flow graph 206 (denoted as target region $510_T$) has been partitioned to be upgraded using a new region intended for call flow graph 206 (denoted as new region $510_N$). The partitioning of target region 510 from call flow graph 206 enables target region 510 to be upgraded in place (i.e., while at least the remaining states 310 and state transitions 320 of call flow graph 206 continue running to provide various graph functions).

As depicted in FIG. 5, target region $510_T$ includes states and state transitions which provide one or more functions as tokens traverse the target region $510_T$. For purposes of completeness in defining target region 510, the return state transitions of the target region $510_T$ are depicted (return state transitions $320_R$ depicted as dashed lines). As described herein, return state transitions $320_R$ occur by popping the return state from the stack. In other words, target region $510_T$ is composed of a set of states and associated state transitions that are partitionable from other regions of call flow graph 206 and which may, therefore, be updated in place As depicted in FIG. 5, new region $510_N$ includes states and associated state transitions adapted to provide one or more functions as tokens traverse new region $510_N$ (i.e., after call flow graph is updated to replace target region $510_T$ with new region $510_N$). The states and state transitions of new region $510_N$ are different than the states and state transitions of target region $510_T$. The function(s) supported by the new region $510_N$ are different than the function(s) supported by the target region $510_T$ (e.g., there may be fewer or more functions supported by new region $510_N$, new region $510_N$ may include upgraded versions of functions of target region $510_T$, and the like).

As depicted in FIG. 5, target region $510_T$ includes three states (denoted as states $310_{T1}$, $310_{T2}$, and $310_{T3}$) and new region $510_N$ includes four states (denoted as states $310_{N1}$, $310_{N2}$, $310_{N3}$, and $310_{N4}$). The target region $510_T$ may be updated with the new region $510_N$ by determining a correspondence (i.e., mapping) between the states $310_T$ of target region $510_T$ and the states $310_N$ of new region $510_N$. A method for updating a target graph region with a new graph region, while at least the remaining portions of the graph (and, optionally, also the portion of the graph that is being updated) continue running, is depicted and described herein with respect to FIG. 6.

Figure 6:
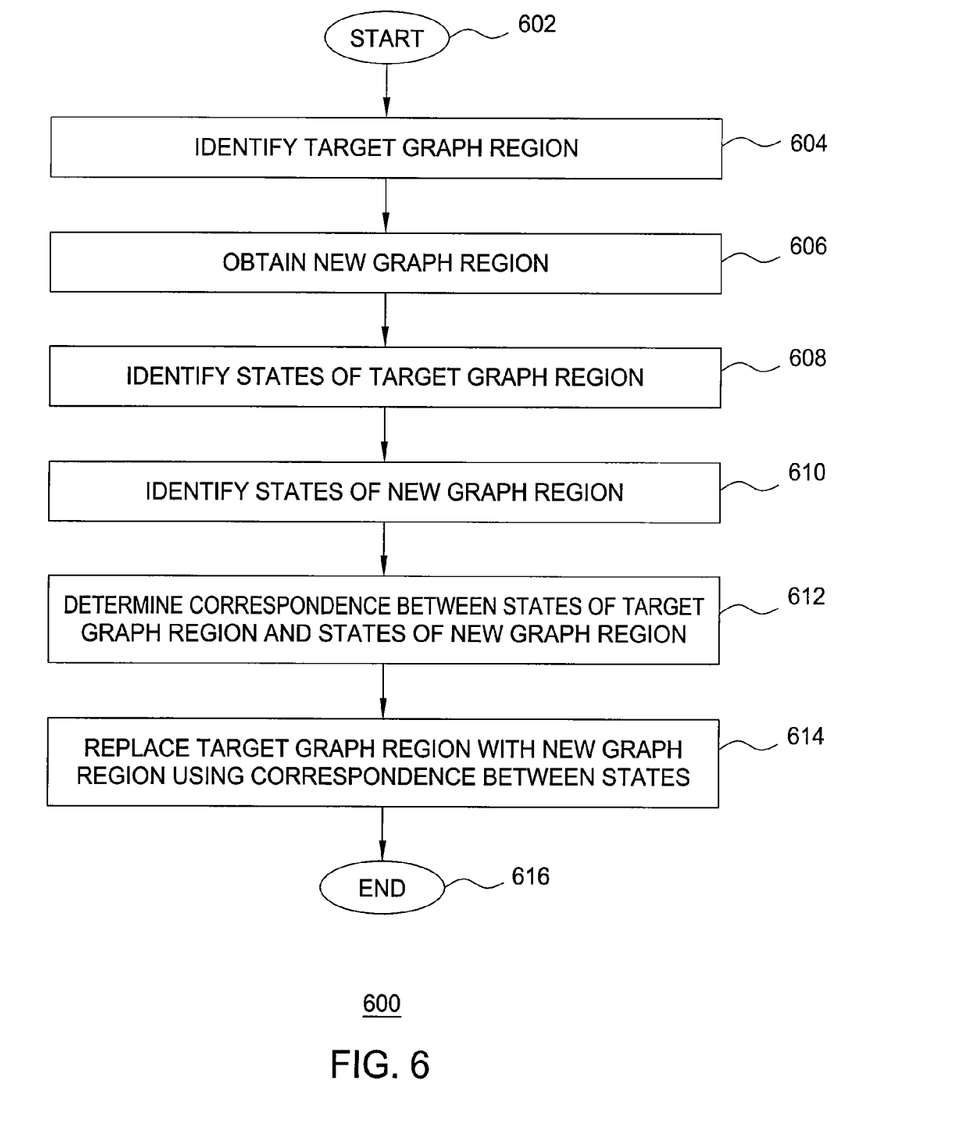
FIG. 6 depicts a method according to one embodiment of the present invention.

FIG. 6 depicts a method according to one embodiment of the present invention. Specifically, method 600 of FIG. 6 includes a method for replacing a target graph region with a new graph region. As described herein, method 600 of FIG. 6 enables a target graph region to be upgraded in place (i.e., while any non-targeted region(s) of the graph, and, optionally, while the targeted region(s) of the graph, continue running to provide functions and services). Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, the target graph region is identified. The target graph region is a region of the graph targeted to be updated. Since a graph region may include one or more functions, the target graph region may be a region of the graph which performs one or more functions targeted to be updated.

At step 606, a new graph region is obtained. The new graph region is the region of the graph intended to be read into the graph in place of the target graph region. The new graph region may be obtained by retrieving the new graph region (i.e., where the new graph region already exists) or by generating the new graph region.

In embodiments in which the new graph region is retrieved, the new graph region may be retrieved locally (e.g., from local memory of the device on which the software is being upgraded) or remotely (e.g., from a remote device in communication with the device on which the software is being upgraded). The new graph region may be retrieved in any manner for retrieving such information.

In embodiments in which the new graph region is generated, the new graph region may be generated in any manner for generating a graph. For example, one or more definition files are read into the execution engine and executed to generate the new graph region; however, the new graph region is not immediately read into the graph to replace the target graph region.

The execution engine queues the new graph region until the target graph region is in a state in which the update can be performed safely.

At step 608, states of the target graph region are identified. At step 610, the states of the new graph region are identified. At step 612, a correspondence between the states of the target graph region and the states of the new graph region is determined. The correspondence is a mapping between the states of the target graph region and the states of the new graph region. In one embodiment, for each state of the target graph region, any corresponding states of the new graph region are identified. The execution engine maintains the determined correspondence between the states of the target graph region and the states of the new graph region for use in suspending tokens in the target graph region in order to update the target graph region with the new graph region.

For each state in the target graph region, there may be zero or more corresponding states in the new graph region. A state in the target graph region that has at least one corresponding state in the new graph region is referred to as a "safe state" because a token that is in this state when the target graph region is replaced with the new graph region is able to continue to circulate within the new graph region. A state in the target graph region that has no corresponding state in the new graph region is referred to as an "unsafe state" because a token that is in this state when the target graph region is replaced with the new graph region is unable to circulate within the new graph region (i.e., this token is orphaned).

In other words, this mapping between states of the target graph region and states of the new graph region enables the execution engine to ensure that each token circulating within the target graph region is able to enter a state that is mapped to at least one state in the new graph region, thereby preventing any existing tokens from being orphaned during the upgrade process. Thus, the present invention enables explicit control in performing a software upgrade such that a region of a graph being updated may be updated safely while remaining portions of the graph (and, optionally, even the portion of the graph being updated) continue running to provide various functions and services.

At step 614, the target graph region is replaced with the new graph region (i.e., such that tokens circulate within the new graph region rather than the target graph region). The new graph region is introduced into the graph by reading the new graph region into the graph. The execution engine may be implemented as a queued transactional engine such that the new graph region may be read into the graph very quickly, thereby reducing the amount of time that the target graph region is out of operation (or is in operation using both the target graph region and the new graph region contemporaneously), possibly eliminating the need to switch the affected functions to another hardware element during the update. The new graph region may be read into the graph to replace the target graph region in a number of different ways.

In one embodiment, the new graph region replaces the target graph region by suspending the operation of the target graph region. In one such embodiment, the new graph region replaces the target graph region by identifying tokens in the target graph region, suspending the tokens of the target graph region, deleting the target graph region from the graph, reading the new graph region into the graph, and releasing the suspended tokens to traverse the new graph region. A method according to this embodiment is depicted and described with respect to FIG. 7. In this embodiment, since the function(s) performed by the target graph region must be suspended, the function(s) performed by the target graph region may be switched to a different hardware element during the update of the target graph region.

In one embodiment, the new graph region replaces the target graph region without suspending the operation of the target graph region. In one such embodiment, the new graph region replaces the target graph region by identifying entry states of the target graph region, renaming identified entry states of the target graph region, reading the new graph region into the graph, and transitioning each of the tokens of the target graph region into the new graph region to traverse the new graph region (and, optionally, deleting the target graph region from the graph). A method according to this embodiment is depicted and described with respect to FIG. 8. In this embodiment, since the function(s) performed by the target graph region are not suspended, the function(s) performed by the target graph region do not need to be switched to a different hardware element during the update of the target graph region.

At step 616, method 600 ends. Although depicted and described as ending, method 600 may be repeated in order to update other regions of the graph. Although primarily depicted and described with respect to one target graph region and one new graph region, any number of new graph regions may replace any number of target graph regions.

Figure 7:
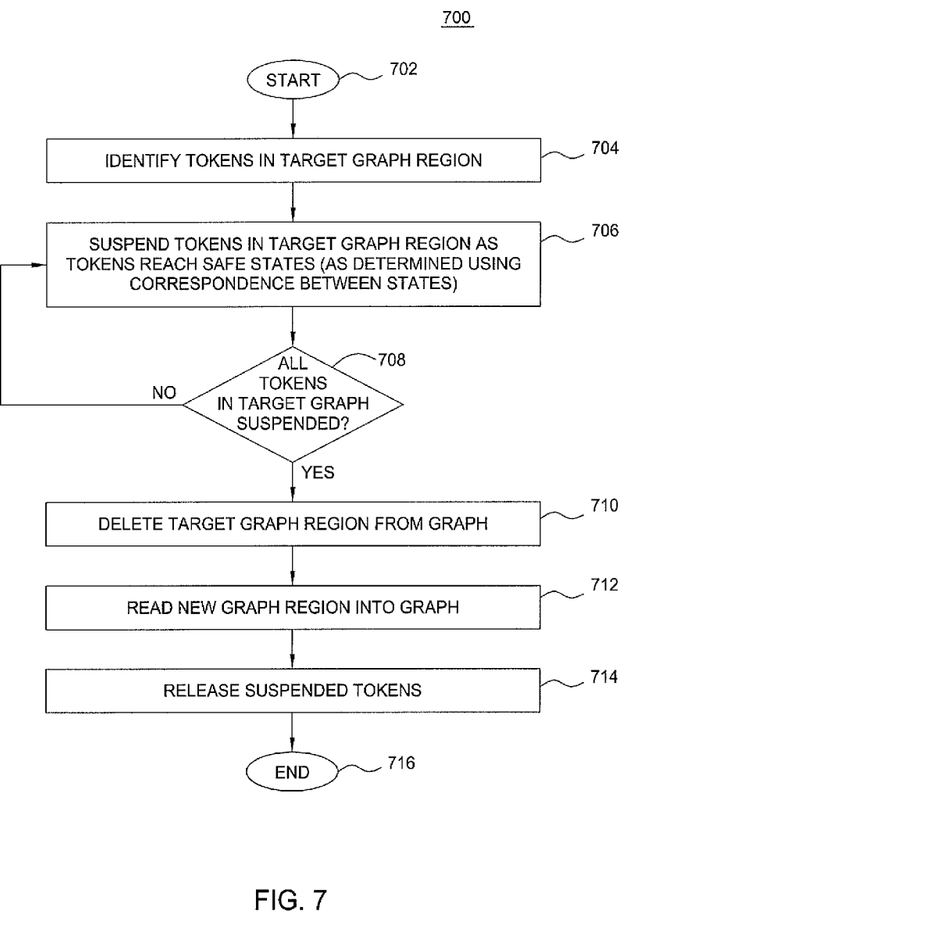
FIG. 7 depicts a method according to one embodiment of the present invention.

FIG. 7 depicts a method according to one embodiment of the present invention. Specifically, method 700 of FIG. 7 includes a method for replacing a target graph region with a new graph region, enabling a target graph region to be upgraded in place (i.e., while any non-targeted portions of the graph continue running to provide functions). The method 700 may be performed as step 614 of method 600 of FIG. 6. Although depicted and described as being performed serially, at least a portion of the steps of method 700 of FIG. 7 may be performed contemporaneously, or in a different order than depicted and described with respect to FIG. 7. The method 700 begins at step 702 and proceeds to step 704.

At step 704, tokens in the target graph region are identified. At step 706, as each identified token in the target graph region enters a safe state, that token is suspended. The identified tokens of the target graph region are suspended using the correspondence between states of the target graph region and states of the new graph region. As described herein, a safe state is a state in the target graph region that has at least one corresponding state in the new graph region, while an unsafe state is a state in the target graph region that does not have any corresponding state in the new graph region.

At step 708, a determination is made as to whether or not all identified tokens in the target graph region have been suspended. The identified tokens of the target graph region must be suspended in safe states, respectively (where multiple tokens may be suspended in the same safe state). If all identified tokens in the target graph region have not been suspended, method 700 returns to step 706 (i.e., tokens circulating within the target graph region continue to be suspended as they reach safe states, until all tokens in the target region have been suspended). If all identified tokens in the target graph region have been suspended, method 700 proceeds to step 710.

In one embodiment, the execution engine may allow the identified tokens of the target graph region to enter safe states naturally. In this embodiment, the execution engine allows the identified tokens of the target graph region to circulate naturally within the target graph region. In this embodiment, the execution engine monitors the tokens of the target graph region as the tokens circulate and, whenever one of the tokens enters a safe state, the execution engine suspends that token such that the token remains in the safe state until the target graph region is updated with the new graph region.

In one embodiment, the execution engine may force tokens of the target graph region to enter safe states. In this embodiment, the execution engine may generate exceptions targeted to specific tokens such that, when the tokens encounter the exceptions, the tokens are forced into safe states in response to the tokens. In this embodiment, the execution engine monitors the tokens of the target graph region and, whenever one of the tokens enters a safe state, the execution engine suspends that token such that the token remains in the safe state until the target graph region is updated with the new graph region.

In one embodiment, the execution engine may use a combination of the natural method and forced method for ensuring that tokens of the target graph region enter safe states in the target graph region. In one such embodiment, for example, the execution engine may allow tokens to circulate naturally for a predetermined period of time and, in response to a determination that any of the tokens of the target graph region has not entered a safe state after the predetermined period of time, the execution engine may then use exceptions to force the remaining tokens into safe states.

At step 710, the target graph region is deleted from the graph. At step 712, the new graph region is read into the graph in place of the target graph region. The execution engine may be implemented as a queued transactional engine such that the new graph region may be read into the graph very quickly, thereby reducing the amount of time that the target graph region is out of operation, possibly eliminating the need to switch the affected functions to another hardware element during the update. At step 714, the suspended tokens are released. The released tokens, as well as any new tokens introduced in the new graph region, traverse the new graph region to provide one or more functions associated with the new graph region. At step 716, method 700 ends.

Figure 8:
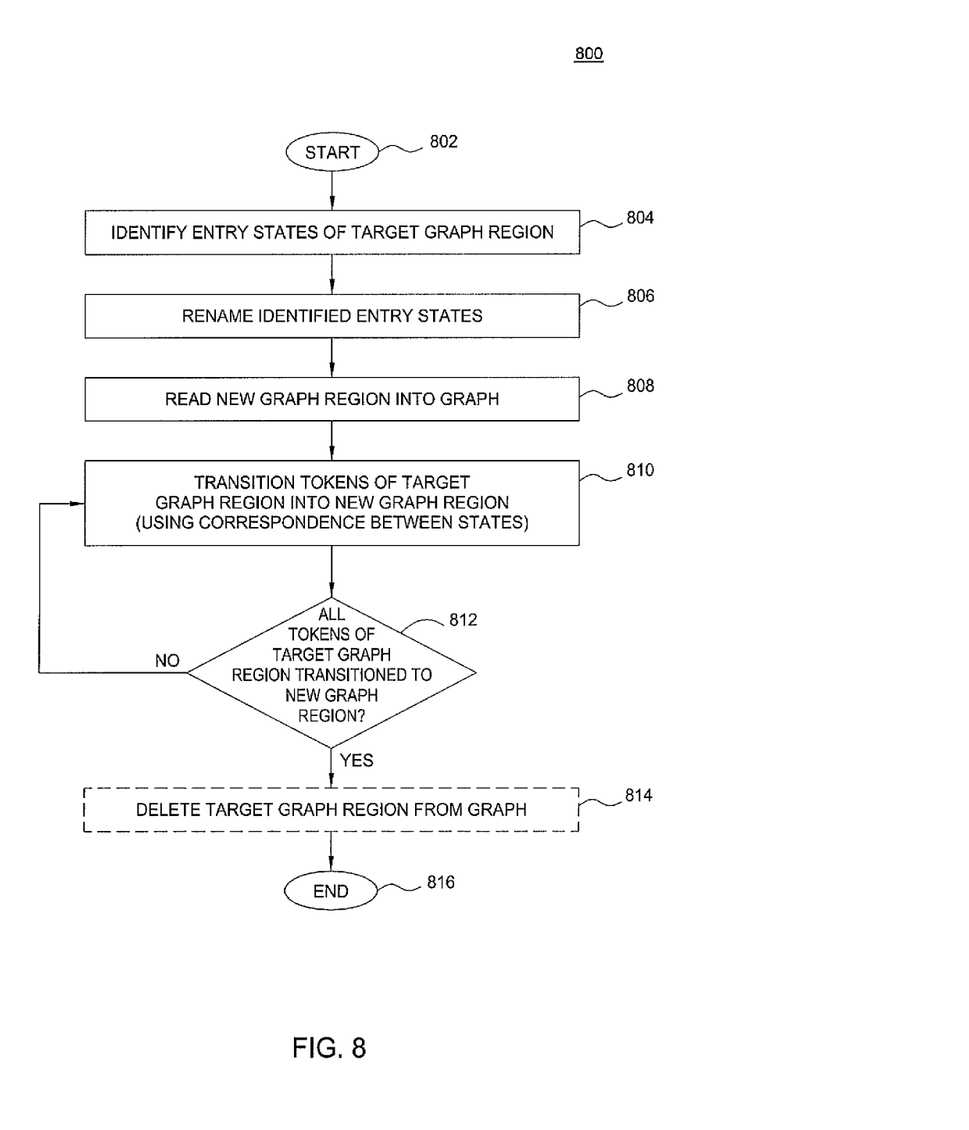
FIG. 8 depicts a method according to one embodiment of the present invention.

FIG. 8 depicts a method according to one embodiment of the present invention. Specifically, method 800 of FIG. 8 includes a method for replacing a target graph region with a new graph region, enabling a target graph region to be upgraded in place (i.e., while both non-targeted portions of the graph and the target graph region continue running to provide functions). The method 800 may be performed as step 614 of method 600 of FIG. 6. Although depicted and described as being performed serially, at least a portion of the steps of method 800 of FIG. 8 may be performed contemporaneously, or in a different order than depicted and described with respect to FIG. 8. The method 800 begins at step 802 and proceeds to step 804.

At step 804, entry states of the target graph region are identified. At step 806, the identified entry states of the target graph region are renamed. This enables the target graph region to continue running to provide any functions supported by the target graph region, but prevents any new tokens from entering the target graph region, which must be drained of existing tokens (i.e., by enabling the tokens of the target graph region to transition from the target graph region to the new graph region using the correspondence between states of the target graph region and states of the new graph region).

At step 808, the new graph region is read into the graph while the isolated target graph region continues running. The execution engine may be implemented as a queued transactional engine such that the new graph region may be read into the graph very quickly, although this is not as important where the target graph region continues running during the software update. At step 810, tokens of the target graph region transition from the target graph region into the new graph region using the correspondence between states of the target graph region and states of the new graph region. By renaming the entry states, while tokens of the target graph region naturally transition to the new graph region, any tokens outside the target graph region that try to enter the target graph region will be automatically transitioned to the new graph region without entering the target graph region.

At step 812, a determination is made as to whether all tokens of the target graph region have transitioned from the target graph region to the new graph region. If all tokens in the target graph region have not transitioned to the new graph region, method 800 returns to step 810 (i.e., tokens circulating within the target graph region continue to transition to the new, until all tokens in the target region have transitioned). If all tokens in the target graph region have transitioned, method 800 proceeds to step 816 (where method 800 ends) or, optionally, proceeds to step 814, at which point the target graph region is deleted from the graph before method 800 proceeds to end step 816.

Thus, since control is explicit and data is explicit, a targeted region of the graph (also referred to as the computation) can be isolated from remaining portions of the graph, thereby enabling the execution engine to restrict the flow of tokens in the targeted region of the graph while tokens continue to flow in the remaining regions of the graph. By isolating the targeted region of the graph, computations in the targeted region of the graph may be suspended such that the targeted portion of the graph may be updated while computations proceed in the other regions of the graph. Thus, since control over the targeted region of the graph is so explicit, the targeted region of the graph may be upgraded in a manner that obviates the need to perform many functions typically required to be performed during upgrades, such as monitoring what is on the stack, monitoring what is on the heap, determining what is invalidated and where it is invalidated (e.g., how far down the stack), and the like.

Furthermore, since the present invention enables software of a system to be upgraded in place, i.e., without switching to a redundant system or taking the system down during the upgrade, the present invention significantly reduces the number of protection elements required to protect functions provided by the system. For example, instead of deploying two pieces of hardware for each function that requires protection, the present invention enables one additional piece of hardware to be deployed to support multiple functions (i.e., the one additional piece of hardware may be oversubscribed), thereby reducing the amount of hardware that must be deployed for a system and, thus, reducing the cost of deploying that system.

For example, for a system supporting ten functions, since the present invention enables one (or two, or three, and so on) function to be upgraded while the nine remaining functions continue to operate, rather than requiring additional redundant hardware sufficient to support all ten functions when only one function is being upgraded, additional hardware sufficient to support only a subset of the ten functions may be required. As noted above, depending on how the software upgrade is performed, additional hardware may or may not be required to perform a software upgrade (i.e., additional hardware is not required where tokens continue to circulate in the target region of the graph during the upgrade). Thus, for example, the system may be deployed with additional hardware sufficient to support one or two functions (e.g., for use during upgrades, or in case of a failure condition in which one or two functions need to be switched to the redundant hardware).

Figure 9:
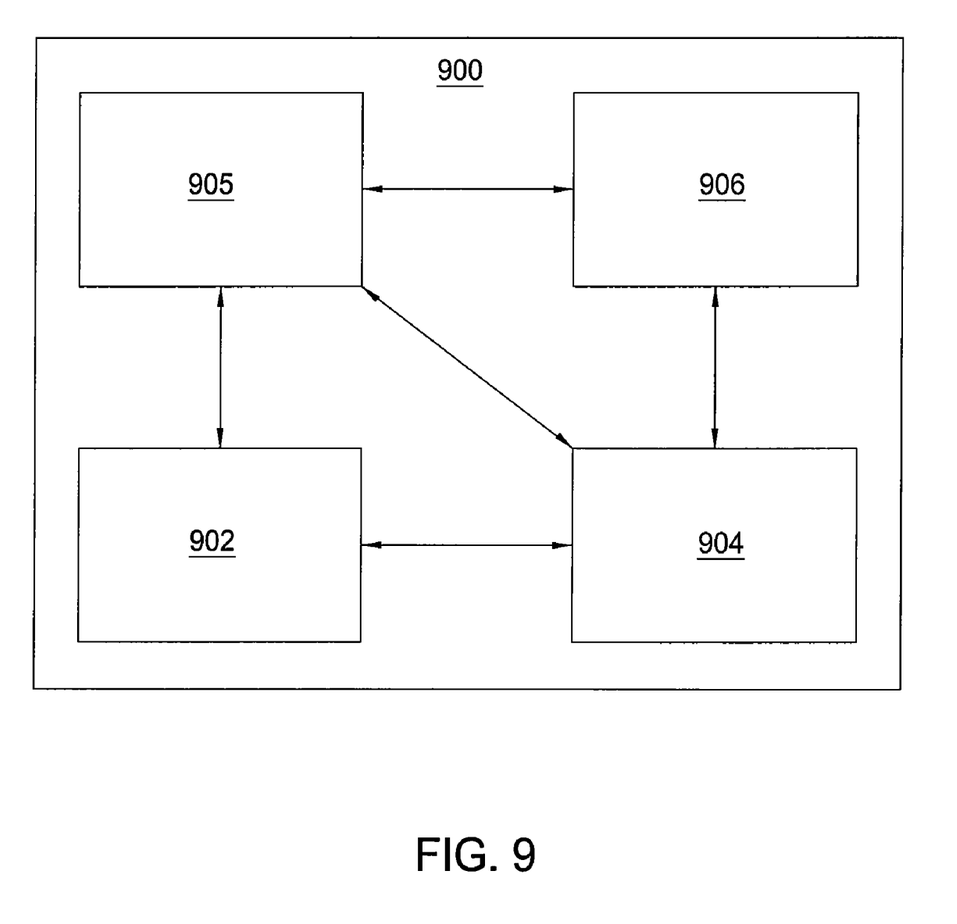
FIG. 9 depicts a high-level block diagram of a general-purpose computer suitable for use in performing the functions described herein.

FIG. 10 depicts a high-level block diagram of a general-purpose computer suitable for use in performing the functions described herein. As depicted in FIG. 10, system 1000 comprises a processor element 1002 (e.g., a CPU), a memory 1004, e.g., random access memory (RAM) and/or read only memory (ROM), an execution engine 1005, and various input/output devices 1006 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present execution engine process 1005 can be loaded into memory 1004 and executed by processor 1002 to implement the functions as discussed above. As such, execution engine process 1005 (including associated data structures) of the present invention can be stored on a computer readable medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, and/or stored within a working memory within a computing device operating according to the instructions.

Although primarily depicted and described herein with respect to a VoIP call agent, a VoIP call flow graph, and associated VoIP call agent functions of the VoIP call flow graph, the present invention may be used to update software in any application in which the software is represented using a graph language.

Although various embodiments which incorporate the teachings of the present invention have been shown and described in detail herein, those skilled in the art can readily devise many other varied embodiments that still incorporate these teachings.

What is claimed is:

1. A method executed by a processor for upgrading software represented as a call flow graph having a plurality of states and a plurality of state transitions where a plurality of tokens traverse the graph executing functions, comprising:
   identifying a target region of the graph;
   obtaining a new region for the graph;
   determining a correspondence between states of the target region of the graph and states of the new region for the graph, said step of determining the correspondence between states of the target region of the graph and states of the new region for the graph comprising:
      identifying states of the target region of the graph;
      identifying states of the new region for the graph; and
      for each of the identified states of the target region of the graph, determining whether any of the states of the new region for the graph are associated with that state of the target region of the graph; and
   replacing the target region of the graph with the new region for the graph using the correspondence between states of the target region of the graph and states of the new region for the graph.

2. The method of claim 1, wherein replacing the target region of the graph with the new region for the graph comprises:
   identifying ones of the tokens associated with the target region of the graph;
   suspending tokens associated with the target region of the graph based on the determined correspondence between states, wherein each token is suspended in a desired state;
   deleting the target region of the graph;
   reading the new region for the graph into the graph; and
   releasing the suspended tokens.

3. The method of claim 2, wherein suspending the tokens associated with the target region of the graph comprises:
   identifying ones of the tokens associated with the target region of the graph;
   forcing each of the identified ones of the tokens associated with the target region of the graph into a desired state; and
   for each token, in response to a determination that the token enters a desired state, suspending the token.

4. The method of claim 2, wherein suspending the tokens associated with the target region of the graph comprises:
   identifying ones of the tokens associated with the target region of the graph;
   monitoring each of the identified ones of the tokens associated with the target region of the graph as the tokens traverse the target region of the graph; and
   for each token, in response to a determination that the token enters a desired state, suspending the token.

5. The method of claim 2, wherein a desired state for a token comprises a state in the target region of the graph having at least one corresponding state in the new region for the graph.

6. The method of claim 1, wherein replacing the target region of the graph with the new region for the graph comprises:
   identifying ones of the states of the target region of the graph that are entry states to the target region of the graph;
   renaming each of the identified entry states;
   reading the new region for the graph into the graph; and
   transferring ones of the tokens associated with the target region of the graph to the new region for the graph using the determined correspondence between states.

7. The method of claim 4, wherein tokens of the graph not associated with the target region of the graph that would otherwise enter the target region of the graph instead enter the new region for the graph using the renamed entry states.

8. The method of claim 1, wherein identifying the target region of the graph comprises:
   selecting at least one function to be upgraded; and identifying ones of the states and ones of the state transitions adapted to perform the selected at least one function.

9. An apparatus comprising a processor for upgrading software represented as a call flow graph having a plurality of states and a plurality of state transitions where a plurality of tokens traverse the graph executing functions, the apparatus comprises:
    means for identifying a target region of the graph;
    means for obtaining a new region for the graph;
    means for determining a correspondence between states of the target region of the graph and states of the new region for the graph, said means for determining the correspondence between states of the target region of the graph and states of the new region for the graph further comprising:
        means for identifying states of the target region of the graph;
        means for identifying states of the new region for the graph; and
        for each of the identified states of the target region of the graph, means for determining whether any of the states of the new region for the graph are associated with that state of the target region of the graph; and
    means for replacing the target region of the graph with the new region for the graph using the correspondence between states of the target region of the graph and states of the new region for the graph.

10. The apparatus of claim 9, wherein the means for replacing the target region of the graph with the new region for the graph comprises:
    means for identifying ones of the tokens associated with the target region of the graph;
    means for suspending tokens associated with the target region of the graph based on the determined correspondence between states, wherein each token is suspended in a desired state;
    means for deleting the target region of the graph;
    means for reading the new region for the graph into the graph; and
    means for releasing the suspended tokens.

11. The apparatus of claim 10, wherein the means for suspending the tokens associated with the target region of the graph comprises:
    means for identifying ones of the tokens associated with the target region of the graph;
    means for forcing each of the identified ones of the tokens associated with the target region of the graph into a desired state; and
    means for suspending each token, where each token is suspended in response to a determination that the token enters a desired state.

12. The apparatus of claim 10, wherein the means for suspending the tokens associated with the target region of the graph comprises:
    means for identifying ones of the tokens associated with the target region of the graph;
    means for monitoring each of the identified ones of the tokens associated with the target region of the graph as the tokens traverse the target region of the graph; and
    means for suspending each token, where each token is suspended in response to a determination that the token enters a desired state.

13. The apparatus of claim 10, wherein a desired state for a token comprises a state in the target region of the graph having at least one corresponding state in the new region for the graph.

14. The apparatus of claim 9, wherein the means for replacing the target region of the graph with the new region for the graph comprises:
    means for identifying ones of the states of the target region of the graph that are entry states to the target region of the graph;
    means for renaming each of the identified entry states;
    means for reading the new region for the graph into the graph; and
    means for transferring ones of the tokens associated with the target region of the graph to the new region for the graph using the determined correspondence between states.

15. The apparatus of claim 14, wherein tokens of the graph not associated with the target region of the graph that would otherwise enter the target region of the graph instead enter the new region for the graph using the renamed entry states.

16. The apparatus of claim 9, wherein the means for identifying the target region of the graph comprises:
    means for selecting at least one function to be upgraded; and
    means for identifying ones of the states and ones of the state transitions adapted to perform the selected at least one function.

17. A non-transitory computer readable medium storing a software program that, when executed by a computer, causes the computer to perform a method for upgrading software represented as a call flow graph having a plurality of states and a plurality of state transitions where a plurality of tokens traverse the graph executing functions, comprising:
    identifying a target region of the graph;
    obtaining a new region for the graph;
    determining a correspondence between states of the target region of the graph and states of the new region for the graph, said step of determining the correspondence between states of the target region of the graph and states of the new region for the graph comprising:
        identifying states of the target region of the graph;
        identifying states of the new region for the graph; and
        for each of the identified states of the target region of the graph, determining whether any of the states of the new region for the graph are associated with that state of the target region of the graph; and
    replacing the target region of the graph with the new region for the graph using the correspondence between states of the target region of the graph and states of the new region for the graph.

18. The non-transitory computer readable medium of claim 17, wherein replacing the target region of the graph with the new region for the graph comprises one of:
    identifying ones of the tokens associated with the target region of the graph, suspending tokens associated with the target region of the graph based on the determined correspondence between states where each token is suspended in a desired state, deleting the target region of the graph, reading the new region for the graph into the graph, and releasing the suspended tokens; or
    identifying ones of the states of the target region of the graph that are entry states to the target region of the graph, renaming each of the identified entry states, reading the new region for the graph into the graph, and transferring ones of the tokens associated with the target region of the graph to the new region for the graph using the determined correspondence between states.

* * * * *